May 22, 1956      J. C. LINDLE      2,746,620
LOADING DEVICE FOR ELEVATED PLATFORMS
Filed Dec. 29, 1953      2 Sheets-Sheet 1
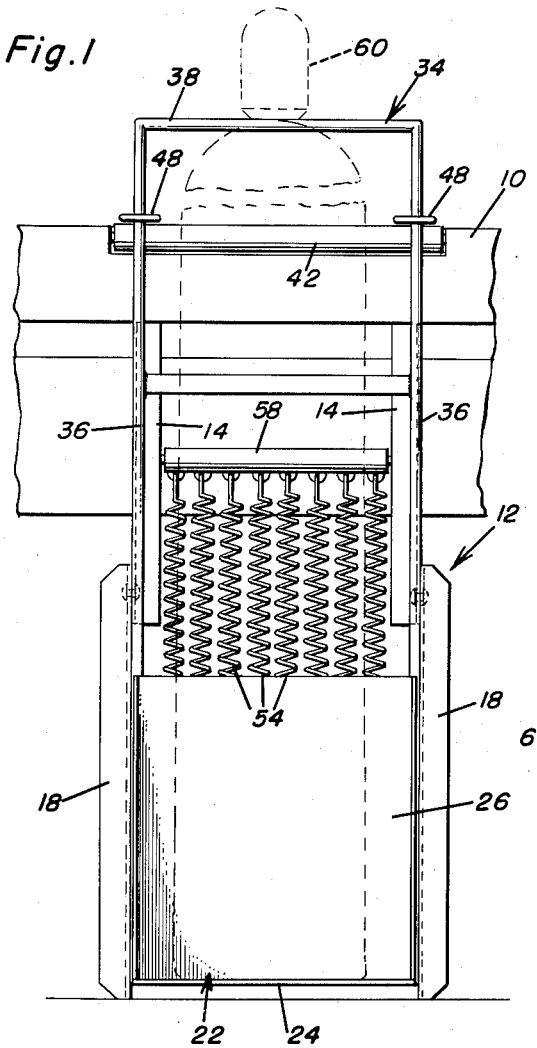
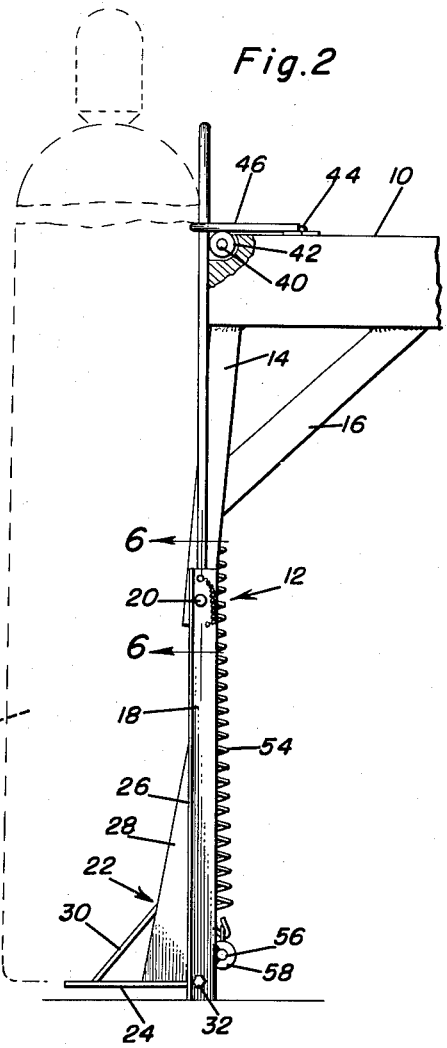
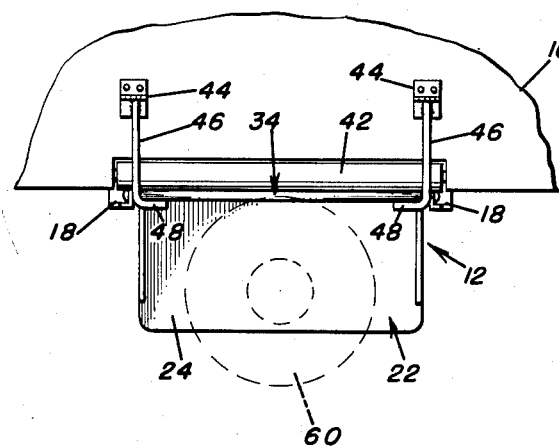
John C. Lindle
INVENTOR.

May 22, 1956  J. C. LINDLE  2,746,620
LOADING DEVICE FOR ELEVATED PLATFORMS
Filed Dec. 29, 1953  2 Sheets-Sheet 2
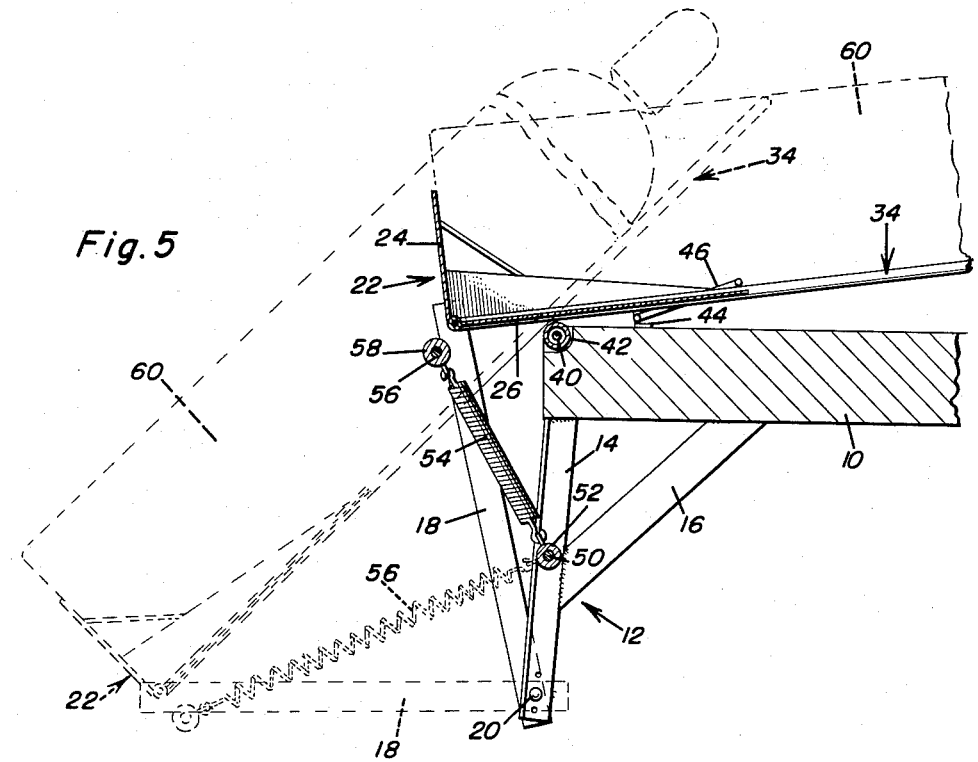
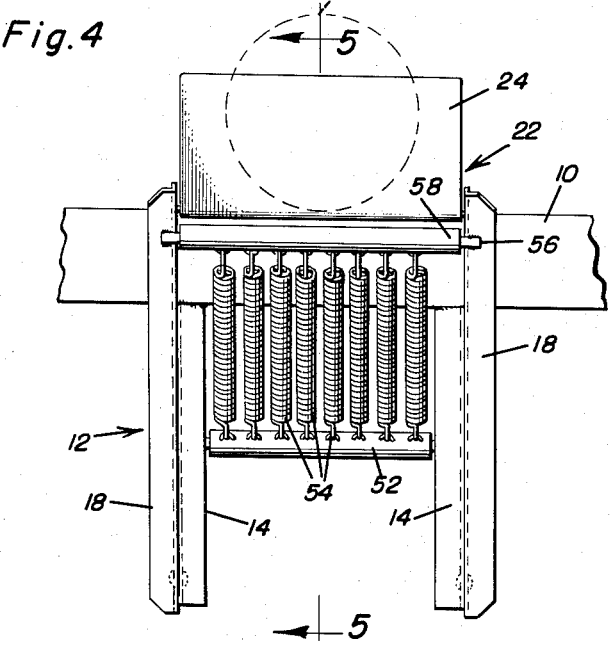
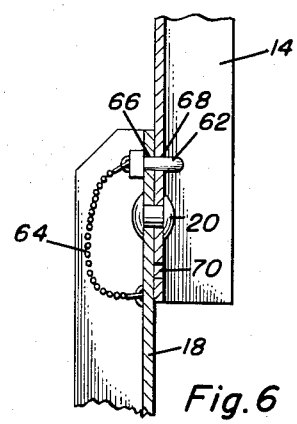
John C. Lindle
INVENTOR.

United States Patent Office 2,746,620
Patented May 22, 1956

2,746,620

LOADING DEVICE FOR ELEVATED PLATFORMS

John C. Lindle, Alexandria, La.

Application December 29, 1953, Serial No. 400,931

3 Claims. (Cl. 214—77)

This invention relates generally to improvements in loading devices and more specifically to a loading attachment for elevated platforms.

The primary object of this invention is to provide a loading attachment for elevated platforms which requires no outside power source.

Another object of this invention is to provide an improved loading attachment which may be conveniently attached to trucks to facilitate the loading and unloading of oxygen and acetylene bottles, the loading attachment being so constructed whereby it is energized for elevating a bottle during an unloading process of another bottle.

Another object of this invention is to provide an improved loading attachment for loading and unloading articles such as oxygen and acetylene bottles, the loading attachment being of such a construction whereby it may be quickly and easily secured to an existing truck bed with a minimum of modification of such truck bed.

A further object of this invention is to provide an improved loading device which is of an extremely simple construction and which is formed of readily obtainable materials so as to be economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of an intermediate portion of a truck bed and shows attached thereto the loading device which is the subject of this invention, the loading device being illustrated in a lowered position and having mounted thereon an oxygen bottle for loading onto the bed of the truck, the oxygen bottle being shown in dotted lines;

Figure 2 is a fragmentary end elevational view of the truck bed and shows the general relationship of the various elements of the loading device as positioned in Figure 1, a portion of the truck bed being broken away and shown in section in order to clearly illustrate the details of a roller carried thereby;

Figure 3 is a fragmentary top plan view of the truck bed of Figure 1 and shows the general position of the carriage when in an oxygen bottle receiving position;

Figure 4 is a fragmentary side elevational view of the truck bed of Figure 1 and shows the loading device in a substantially article loaded position;

Figure 5 is a fragmentary transverse vertical sectional view taken substantially upon the plane indicated by the section line 5—5 of Figure 4 and shows the relationship of the various elements of the loading device when in substantially an article loading position, an intermediate position of the loading device being shown by dotted lines; and Figure 6 is an enlarged fragmentary vertical sectional view taken substantially upon the plane indicated by the section line 6—6 of Figure 2 and shows the means for retaining the loading device either in an elevated or a lowered position.

Referring now to the drawings in detail, it will be seen that there is illustrated an intermediate portion of a conventional truck bed 10. Inasmuch as the truck bed 10 in itself plays no part of the present invention and, if desired, could be in the form of a stationary platform, the details of the truck bed will not be set forth in more detail hereinafter. Carried by the truck bed 10 at one side edge thereof intermediate its ends is the loading device which is the subject of this invention, the loading device being referred to in general by the reference numeral 12.

The loading device 12 includes a support depending from the underside of the truck bed 10, the support including a pair of depending, longitudinally spaced support members 14 which extend downwardly and slightly outwardly. The support members 14 are braced intermediate their ends by diagonal braces 16. It is preferred that the support members 14 and the braces 16 be formed of angle irons.

Pivotally secured to the support members 14 adjacent the lower ends thereof are elongated links or lift arms 18. The links 18 are also preferably formed of angle irons and are connected to their respective supports 14 by pivot pins 20. It will be noted that the pivot pins 20 pass through the support members 14 and the links 20 at points spaced from their ends for a reason to be explained in more detail hereinafter.

The loading device 12 also includes a carriage which is referred to in general by the reference numeral 22. The carriage 22 includes a base 24 and a vertical portion 26. The vertical portion 26 is formed of a sheet and has formed integral therewith side portions 28. The base 24 is braced by the side portions 28 and diagonal braces 30.

Secured to the base 30 at its intersection with the vertical portion 26 is an elongated pivot pin 32. The pivot pin 32 has free ends thereof rotatably journalled in the ends of the links 18 remote from the pivot pins 20. It will be understood that the pivot pin 32 extends between the links 18 which are disposed in spaced parallel relation.

Secured to upper portions of the vertical portion 26 along the side edges thereof is an inverted U-shaped guide member which is referred to in general by the reference numeral 34. The guide member 34 extends upwardly as an extension of the vertical portion 18 and includes a pair of spaced parallel legs 36 and a web portion 38.

Carried by the truck bed 10 within the confines thereof is a longitudinally extending shaft 40 on which is mounted a longitudinally extending roller 42. It will be noted that the roller 42 is disposed at an upper edge corner of the truck bed 10 and projects slightly outwardly of the side of the truck bed and slightly above the top of the truck bed. The roller 42 is so positioned whereby it is engaged with the legs 36 of the guide member 34.

Hingedly secured to the upper surface of the truck bed 10 inwardly from the side edge thereof as at 44 is a pair of guide arms 46. The guide arms 46 have opposed end portions 48 which engage the outer surfaces of the legs 36 so as to retain the legs 36 against the roller 42 at all times. In order to facilitate sliding movement of the legs 36 with respect to the guide arms 46, both the guide member 34 and the guide arms 46 are made of circular cross sectional material.

Extending between the support members 14 at the points of intersections with the braces 16 is a shaft 50 on which is mounted an elongated sleeve 52. The sleeve 52 has secured thereto a plurality of spring members 54.

Extending between the lower ends of the links 18 and rigidly secured thereto is a shaft 56. The shaft 56 has rotatably mounted thereon an elongated sleeve 58. The opposite ends of the springs 54 are secured to the sleeve 58.

Referring now to Figures 1, 2 and 3 in particular, it will be seen that the carriage 22 is in position for receiving an object to be loaded in the truck bed 10, such as the oxygen bottle 60. When the carriage 22 is in its lowermost position, the springs 54 are extended and are in a tensioned state. It will be noted that the links 18 are disposed off-center with respect to the support members 14 so that accidental elevation of the carriage 22 is eliminated. However, in order to further eliminate the accidental elevating of the carriage 22, there is provided latch means in the form of a latch pins 62, as is best illustrated in Figure 6. The latch pin 62 is connected by a chain 64 to its associated link 18. It will be understood that there is provided a latch pin 62 for each of the links 18. When the carriage 22 is in its lowermost position, an aperture 66 in the end portion of the link 18 is aligned with an aperture 68 disposed above the pivot pin 20 of its associated support member 14. It will be seen that the latch pin 62 retains the carriage 22 against pivoting until removed.

After the oxygen bottle 60 has been properly positioned on the carriage 22, the latch pins 66 are removed. It is preferred that the strength of the springs 54 be such that the weight of the oxygen bottle 60 will prevent upward movement of the carriage 22. Then by a slight assist from the person loading the oxygen bottle 60, the carriage 22 is moved outwardly and upwardly so as to move the springs 54 from their over-center position. The springs 54 together with the slight assistance afforded by the person loading the oxygen bottle 60 onto the carriage 22, will swing said carriage upwardly and inwardly over the top of the truck bed 10 due to the pivoting movement of the carriage 22 on the support members 14. It will be understood that the carriage 22 will be guided in its upward swinging movement by the guide member 34 and the guide arms 48.

Referring now to Figure 5 in particular, it will be seen that the relationship of the various portions of the loading base 12 is such that the oxygen bottle 60 will be moved to a position overlying the truck bed 10. From this position it may be easily rolled to a desired position on the truck bed 10.

When the carriage 22 is in its uppermost position, the aperture 66 becomes aligned with the lower aperture 70 in the associated support member 14. By inserting the latch pin 62 through the aligned apertures 66 and 70, the carriage 22 may be retained in its uppermost position.

When it is desired to unload an article, such as the oxygen bottle 60, the article is loaded upon the carriage 22 and a generally horizontal position and then through the slight exertion of pressure thereon the carriage 22 will swing downwardly to its lowermost position due to primarily the weight of the article carried thereby. At this time the springs 54 will again be tensioned. In the event it is desired to load an article without first unloading one, the springs 54 may be tensioned by applying the weight of an operator on the carriage 22.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A loading attachment for an elevated platform comprising a support depending from said platform at an edge thereof, a vertically disposed carriage secured to said support for vertical swinging and pivotal movement relative to said support, spring means carried by said support and connected to said carriage for elevating said carriage, guide means carried by said platform engaging said carriage for guiding said carriage from its vertical position to a horizontal position overlying said platform upon elevation of said carriage, rollers on said platform engaging said carriage to control pivoting thereof, said guide means continuously retaining said carriage in engagement with said rollers.

2. A loading attachment for an elevated platform comprising a support depending from said platform at an edge thereof, a vertically disposed carriage secured to said support for vertical swinging and pivotal movement relative to said support, spring means carried by said support and connected to said carriage for elevating said carriage, guide means carried by said platform engaging said carriage for guiding said carriage from its vertical position to a horizontal position overlying said platform upon elevation of said carriage, said guide means being pivotally mounted and slidably engaging said carriage.

3. A loading attachment for an elevated platform comprising a support depending from said platform at an edge thereof, a lift arm pivotally secured to said support, a carriage pivotally carried by said lift arm, spring means extending between said lift arms and said support to urge said carriage to an elevated position, and guide means carried by said platform guidingly engaging said carriage to gradually tilt said carriage from a generally vertical position to a generally horizontal position overlying said platform, said guide means including a roller on said platform and a guide pivotally carried by said platform and slidably engaging said carriage to retain said carriage in engagement with said roller.

References Cited in the file of this patent

UNITED STATES PATENTS

| | | |
|---|---|---|
| 896,271 | Burt et al. | Aug. 18, 1908 |
| 1,429,004 | Wick | Sept. 12, 1922 |
| 1,604,494 | Snyder | Oct. 26, 1926 |
| 1,945,426 | Evoy | Jan. 30, 1934 |
| 2,033,243 | Jester | Mar. 10, 1936 |
| 2,189,052 | Anthony | Feb. 6, 1940 |
| 2,479,035 | Burkey | Aug. 16, 1949 |
| 2,670,861 | Fondriest et al. | Mar. 2, 1954 |
| 2,680,529 | Narvestad et al. | June 8, 1954 |

FOREIGN PATENTS

| | | |
|---|---|---|
| 17,252/28 | Australia | Dec. 6, 1928 |